United States Patent [19]
Allcock et al.

[11] Patent Number: 5,457,160
[45] Date of Patent: Oct. 10, 1995

[54] POLYPHOSPHAZENE BLENDS

[75] Inventors: Harry R. Allcock; Karyn B. Visscher, both of State College, Pa.

[73] Assignee: The Penn State Research Foundation, University Park, Pa.

[21] Appl. No.: 157,951

[22] Filed: Nov. 24, 1993

[51] Int. Cl.$^6$ ............................ C08L 85/02; C08L 33/12
[52] U.S. Cl. ...................... 525/188; 525/409; 525/538
[58] Field of Search ..................................... 525/188, 409, 525/538

[56] References Cited

U.S. PATENT DOCUMENTS

| | | | |
|---|---|---|---|
| 3,364,189 | 1/1968 | Allcock | 524/881 |
| 4,061,606 | 12/1977 | Dleck | 525/18 D |
| 5,101,002 | 3/1992 | Klobucar | 525/538 |
| 5,250,626 | 10/1993 | Landry | 525/188 |

OTHER PUBLICATIONS

Chen–Yang "The Compatibility and Properties of Poly-(Chlorophenoxy Phosphazene) Blends" *Polymer Preprints* 34(1) pp. 272–273 Mar. 1993 Chemical Abstract 115(16): 159963f.

*Primary Examiner*—David Buttner
*Attorney, Agent, or Firm*—Cheryl K. Zalesky; Kilpatrick & Cody

[57] ABSTRACT

Polymer blends of the following:

(i) poly[bis(methylamino)phosphazene] and poly[bis(2-(2-methoxyethoxy)ethoxy)phosphazene;

(ii) poly[bis(methylamino)phosphazene] with poly(vinyl chloride), poly(methyl methacrylate), poly(ethylene oxide), or polystyrene;

(iii) poly[bis(2-(2-methoxyethoxy)ethoxy)phosphazene with poly(vinyl alcohol) or poly(acrylic acid); and (iv) poly[bis(phenoxy)phosphazene] with polystyrene or poly(methyl methacrylate).

6 Claims, 10 Drawing Sheets

3

Tg = 14° C

4

Tg = -84° C

5

Tg = -6° C

6

Tg = -66° C

7

Tg = -23° C

Poly(vinyl chloride) (8)
Tg = 82° C

Polystyrene (9)
Tg = 100° C

Poly(methyl methacrylate) (10)
Tg = 105° C

Poly(4-vinyl pyridine) (11)
Tg = 142° C

Poly(vinyl alcohol) (12)
Tg = 125° C

Poly(acrylic acid) (13)
Tg = 114° C

Poly(ethylene oxide) (14)

POLYPHOSPHAZENE BLENDS

The U.S. government has rights in this invention by virtue of a grant from the U.S. Army Research Office and the Air Force Office of Scientific Research.

This invention is in the area of polymer chemistry, and in particular is a group of polyphosphazene blends.

BACKGROUND OF THE INVENTION

A strong need exists in science and technology for new macromolecular materials with specifically tailored properties for a wide variety of purposes. These materials can be provided through the synthesis of new macromolecules or by the combination of existing macromolecular materials in alloys or composites to give new materials that exhibit a combination of the properties of the component macromolecules, or perhaps new properties. A number of multicomponent polymer systems are known, including graft and block copolymers, filler-reinforced polymers, polymer blends (alloys), polymer laminates, and interpenetrating polymer networks (IPNs).

Polymer blends or alloys are physical mixtures of two or more polymers. The component macromolecules are held together by noncovalent intermolecular interactions such as hydrogen bonding, dipole-dipole interactions, or van der Waals forces. The strength of the interactions depends on the functional groups in the macromolecules. The roles played by different functional groups in these interactions has been reported in detail for organic polymers. Coleman, M.; Painter, P. C. Fourier Transform Infrared Spectroscopy. Appl. Spectrosc. Rev. 1984, 20, 256–346; Painter, P. C. Macromolecules 1988, 21, 666; Painter, P. C. Macromolecules 1989, 22, 570; Painter, P. C. Macromolecules 1989, 22, 580; Olabisi, P.; Robeson, L. M.; Shaw, M. T. Polymer-Polymer Miscibility; Academic Press: New York, 1979, p. 207 and references therein.

Polymer blends can exist as miscible one-phase systems, as semimiscible systems that have miscible domains which exist together with phases rich in one of the constituent polymers, or as immiscible multi-phase materials systems. In a miscible blend, the interactions between the two different components are presumably stronger than the interactions between the individual molecules of a single species. In an immiscible blend, the reverse is true. Many examples exist of miscible and immiscible polymer blends. An example of a miscible blend is that between polycaprolactone and poly(vinyl chloride), in which the blend is apparently stabilized by intermolecular hydrogen bonding between the Cl—C—H unit of the poly(vinyl chloride) and the proton-accepting character of the carbonyl group of the polycaprolactone. Olabisi, O. Macromolecules 1975, 8, 316.

Weakly interacting miscible blends can undergo phase separation over time. In fact, phase separation can be used as a measure of the weakness of intermolecular interactions between the constituent materials. The degree of separation can be determined by comparing characterization data from freshly prepared polymer blends with those prepared previously.

Polyphosphazenes are a relatively new class of inorganic polymers that contain a flexible backbone of P—N repeating units and two organic, inorganic, or organometallic groups attached to each phosphorous atom. These polymers can be prepared by the thermal ring opening polymerization of hexachlorocyclotriphosphazene to form poly(dichlorophosphazene) which is employed as a reactive macromolecular intermediate. The chlorine atoms in this polymer can be replaced via nucleophilic substitution reactions using, for example, alkoxy, aryloxy or amino reagents to give stable poly(organophosphazene) derivatives.

Polyphosphazenes exhibit a wide variety of physical and chemical properties which are a function of the substituent groups on the phosphorus atoms. For example, polyphosphazenes can be prepared that have flame-retardant properties, high resistance to oil and solvents, high backbone and materials flexibility, fiber and film forming properties, biodegradability, ceramic properties, non-linear optical utility, low temperature elastomeric properties, biomaterials, polymeric drugs, polymeric delivery systems, hydrogels, liquid crystals, and electrical semiconductors.

In the thesis of Paul E. Austin (*Polyphosphazenes, New Biomaterials*, Penn State University, 1984), the following polymer blends were reported:

(i) $[NP(OCH_2CF_3)_2]_n$ (referred to as poly[bis(trifluoroethoxy)phosphazene)] with poly(methylmethacrylate), poly(vinylpyrrolidone), and phenoxy resin; and (ii) $[NP(HNCH_3)2]_n$ (referred to as poly[bis(methylamino)phosphazene]) with poly(vinylpyrrolidone), poly(acrylic acid), poly(vinyl alcohol), and methyl cellulose. No miscibility testing was done on these materials. Blends of poly[bis((methoxyethoxy)ethoxy)phosphazene] (MEEP) with poly(ethylene oxide) have also been widely reported in the literature.

In light of the increasing interest in new macromolecular materials with specifically tailored properties, and the versatility of phosphazene polymers, it is an object of the present invention to provide new polymer blends that include polyphosphazenes for a variety of uses.

SUMMARY OF THE INVENTION

It has been discovered that poly[bis(methylamino)phosphazene] (3) and poly[bis(2-(2-methoxyethoxy)ethoxy)phosphazene (4) can be blended into a semimiscible alloy. It has also been discovered that poly[bis(methylamino)phosphazene] forms a semimiscible blend with several organic polymers, including poly(vinyl chloride), poly(methyl methacrylate), poly(ethylene oxide), and polystyrene. Poly[bis(2-(2-methoxyethoxy)ethoxy)phosphazene was forms a semimiscible blend with poly(vinyl alcohol) and poly(acrylic acid).

poly[bis(phenoxy)phosphazene] was found to form a semimiscible alloy with polystyrene and with poly(methyl methacrylate).

Miscible and immiscible phosphazene alloys are useful as one or more of the following: membranes, biomaterials, flame retardant materials, oil and solvent resistant materials, fibers, films, energy absorbers, shock absorbers, ceramics, non-linear optical materials, low temperature elastomers, polymeric delivery systems, or hydrogels.

Semimiscible, miscible, and immiscible blends of polyphosphazenes with other polyphosphazenes or with organic polymers can be modified as desired by subsequent crosslinking on exposure to ultraviolet, gamma or other high energy radiation.

DETAILED DESCRIPTION OF THE INVENTION

I. Definitions

As used herein, the term miscible polymer blend refers to a blend that exhibits a single glass transition temperature ($T_g$).

As used herein, the term semimiscible polymer blend refers to a blend that exhibits either three $T_g$s (two for the component materials and a new intermediate $T_g$) or two $T_g$s, wherein at least one of the $T_g$s is displaced from the value of the component polymer.

As used herein, the term immiscible polymer blend refers to a blend that exhibits only the $T_g$s of its constituent polymers.

II. Polyphosphazenes and Organic Polymers used in Blends

Polyphosphazenes can be prepared as described in literature references, including Allcock, H. R.; Kugel, R. L. J. Am. Chem. Soc. 1965, 87, 4216; Allcock, H. R.; Kugel, R. L. Inorg. Chem. 1966, 5, 1709; and Allcock, H. R.; Kugel, R. L. Inorg. Chem. 1966, 5, 1716.

Figure 1:
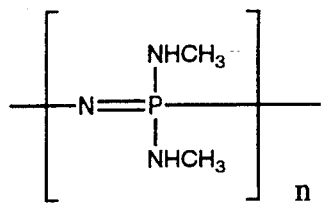
FIG. 1 is an illustration of the chemical structures of phosphazene polymers (polymer 3, poly[bis(methylamino)phosphazene]; polymer 4, poly[bis(2-(2-methoxyethoxy)ethoxy)phosphazene]; polymer 5, poly[bis(phenoxy)phosphazene]; polymer 6, poly[bis(trifluoroethoxy)phosphazene]; and polymer 7, poly[bis(propyloxy benzoate)phosphazene]).
Figure 1:
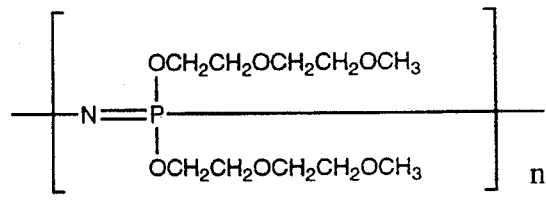
Figure 1:
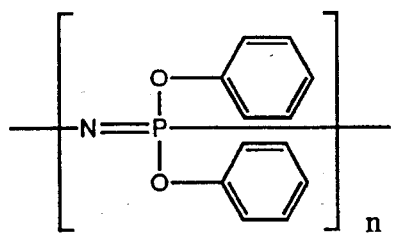
Figure 1:
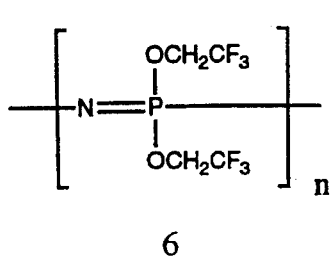
Figure 1:
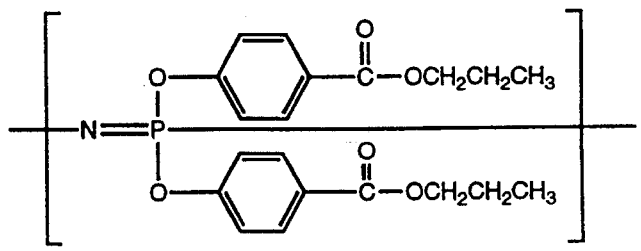
Figure 2:
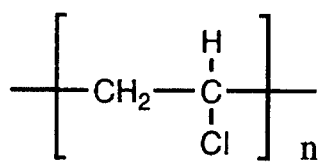
FIG. 2 is an illustration of the chemical structures of organic polymers used in the preparation of the polymer blends described herein (polymer 8, poly(vinyl chloride); polymer 9, polystyrene; polymer 10, poly(methyl methacrylate); polymer 11, poly(4-vinyl pyridine); polymer 12, poly(vinyl alcohol); polymer 13, poly(acrylic acid); and polymer 14, poly(ethylene oxide).
Figure 2:
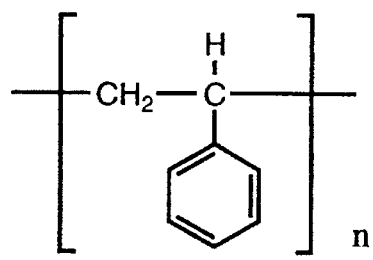
Figure 2:
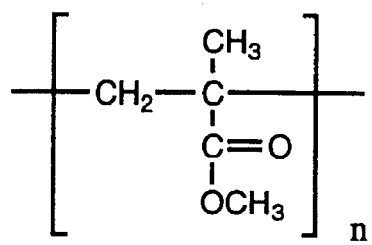
Figure 2:
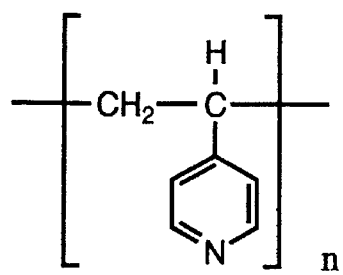
Figure 2:
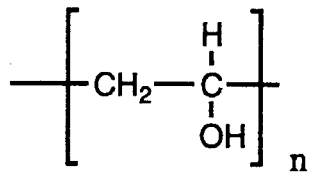
Figure 2:
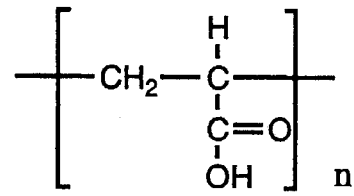
Figure 2:
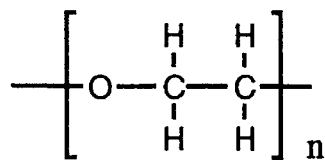

The polyphosphazenes and organic polymers used to prepare the blends are illustrated in FIGS. 1 and 2, respectively. Poly[bis(methylamino)phosphazene] (3) is a colorless, transparent, hydrophilic material which is soluble in water and slightly soluble in organic solvents. This material forms flexible films and has a $T_g$ at +14° C. It undergoes cross-linking during prolonged exposure to $^{60}$Co γ-radiation. Poly[bis(2-(2-methoxyethoxy)ethoxy)phosphazene] (4) is a transparent, hydrophilic polymer which is soluble in both aqueous and organic solvents. Polyphosphazene 4 has a $T_g$ of −84° C. and can be cross-linked by exposure to $^{60}$Co γ-radiation to form a material with improved dimensional integrity. In its un-cross-linked form, it has a low resistance to viscous flow. Poly[diphenoxyphosphazene] (5) is an opaque, white hydrophobic material. This polymer, in the solid state, forms microcrystalline films or fibers, is soluble in many organic solvents, and has a $T_g$ at −6° C.

Poly[bis(trifluoroethoxy)phosphazene] (6) is an opalescent, very hydrophobic material which forms flexible microcrystalline films, is soluble in many organic solvents, and has a $T_g$ at −66° C. Poly[bis(propyloxy benzoate)phosphazene] (7) is a transparent, elastomeric solid which is soluble in many organic solvents. This hydrophobic polymer has a glass transition temperature at −23° C.

III. Preparation and Characterization of Polymer Blends

Analytical Equipment and Techniques. Tetrahydrofuran (THF, Aldrich Chemical Company) and dioxane (Aldrich) were distilled from sodium-benzophenone ketyl under a dry nitrogen atmosphere. The organic polymers used were obtained from the following sources: poly(vinyl chloride) (Aldrich), polystyrene (Aldrich), (poly(methyl methacrylate) (Cellomer Assoc.), poly(4-vinylpyridine) (Polysciences), and poly(ethylene oxide) (Aldrich). All of the organic polymers were used as received.

Glass transition temperatures ($T_g$) were recorded with the use of a Perkin-Elmer DSC-7 unit equipped with a PE 7500 computer. The samples (10–30 mg) were analyzed in crimped aluminum pans using heating rates of 10, 20, and 40° C./min, and a helium flow of 10 mL/min was used. Before beginning each run, the samples were annealed for 3 minutes at 110° C. The instrument was calibrated with both cyclohexane and indium standards with thermal transitions at −87.06 and 6.54, and at 156° C., respectively. Transmission electron micrographs (TEMs) were obtained using a JEOL TEM 1200 EXII transmission electron micrograph with a power setting of 80 kV and an exposure time of 1 second. The magnification of all TEM photographs was 14000×. TEM samples were prepared using an LKB Ultratome III microtome.

The synthesis of the phosphazene polymers has been reported previously and all posses molecular weights in the range of 1×10$^6$.

Preparation of Blends. Samples of each component polymer (mol percents from 10% to 90% of each component) were dissolved (with heating) in a common solvent (such as THF or ethanol for hydrophobic polymer blends, or water for aqueous soluble polymers) or in a co-solvent system (water/THF for blends containing polymer 3 and hydrophobic organic polymers). Because polymer 3 was only slightly soluble in THF, the dissolved polymer solutions were combined and stirred vigorously at room temperature for several hours. The combined mixtures were then cast into films in Teflon-coated dishes. After evaporation of the solvent, the materials were dried in vacuo for 48 hours. Following preparation, all samples were stored in air.

Several ways exist for the characterization of polymer blends, including FT-IR, differential scanning calorimetry (DSC), and electron microscopy-scanning electron microscopy (SEM), or transmission electron microscopy (TEM). The blends disclosed herein were characterized primarily by DSC and TEM. FT-IR was not used for characterization due to the overlapping peaks of the constituent polymers.

An effective ways to interpret the miscibility of polymers in an alloy is to examine the thermal transitions using DSC. A completely miscible system should have a single glass transition temperature ($T_g$) located between the values for the component macromolecules. A partially miscible blend will generate either three $T_g$'s (two for the component materials and a new intermediate Tg) or two $T_g$'s, displaced from the values of the component polymers. Both the miscibility and strength of intermolecular interactions with the system can be estimated as a function of time by examining thermal transitions of long-existing and new miscible or semimiscible polymer blends.

Electron microscopy is a good method to monitor the topography of the film surface and the phase structure of multi-component materials. Scanning electron microscopy (SEM) provides information about the film surface, while transmission electron microscopy (TEM) is used to probe the phase structure and domain size of the components within a polymer blend. Electron microscopy is also useful to analyze the potential phase separation of miscible or semimiscible polymer blends after long periods of time. TEM microscopy is especially useful for phosphazene systems due to the fact that the heavier an element, the darker it will appear in the TEM. Therefore, alloys containing phosphazenes do not need to be stained. The phosphazene-containing regions automatically appear darker than the organic polymer sections.

Phosphazene/Phosphazene Polymer Blends. Polymer blends containing all pairwise combinations of the polymers poly[bis(methylamino)phosphazene] (3), poly[bis(2-(2-methoxyethoxy)ethoxy)phosphazene] (4), poly[bis(phenoxy)phosphazene] (5), poly[bis(trifluoroethoxy)phosphazene] (6), and poly[bis(propyloxy benzoate)phosphazene] (7), depicted in FIG. 1, were prepared using ratios of the starting components that ranged from 10% to 90% of each component.

The blending of phosphazenes 3 and 4 resulted in a semimiscible alloy. Thermal transitions for both constituent polymers were detected in those samples that contained more than 20% polymer 3. Semimiscibility was indicated by a 20° C. displacement of the $T_g$ of polymer 3 (normally at +14° C.) beginning at 30% of 3 and increasing as the percentage of 3 increased in the blend. In addition, new transitions were detected in samples that contained more than 50% polymer 3. These new $T_g$'s fell between the values of the constituent polymers (+14° C. 93) and −84° C. (4)) and ranged from −52° to −48° C. This indicated that completely miscible regions existed within the material. This miscibility is probably due to hydrogen bonding between the two constituent polymers.

Figure 3:
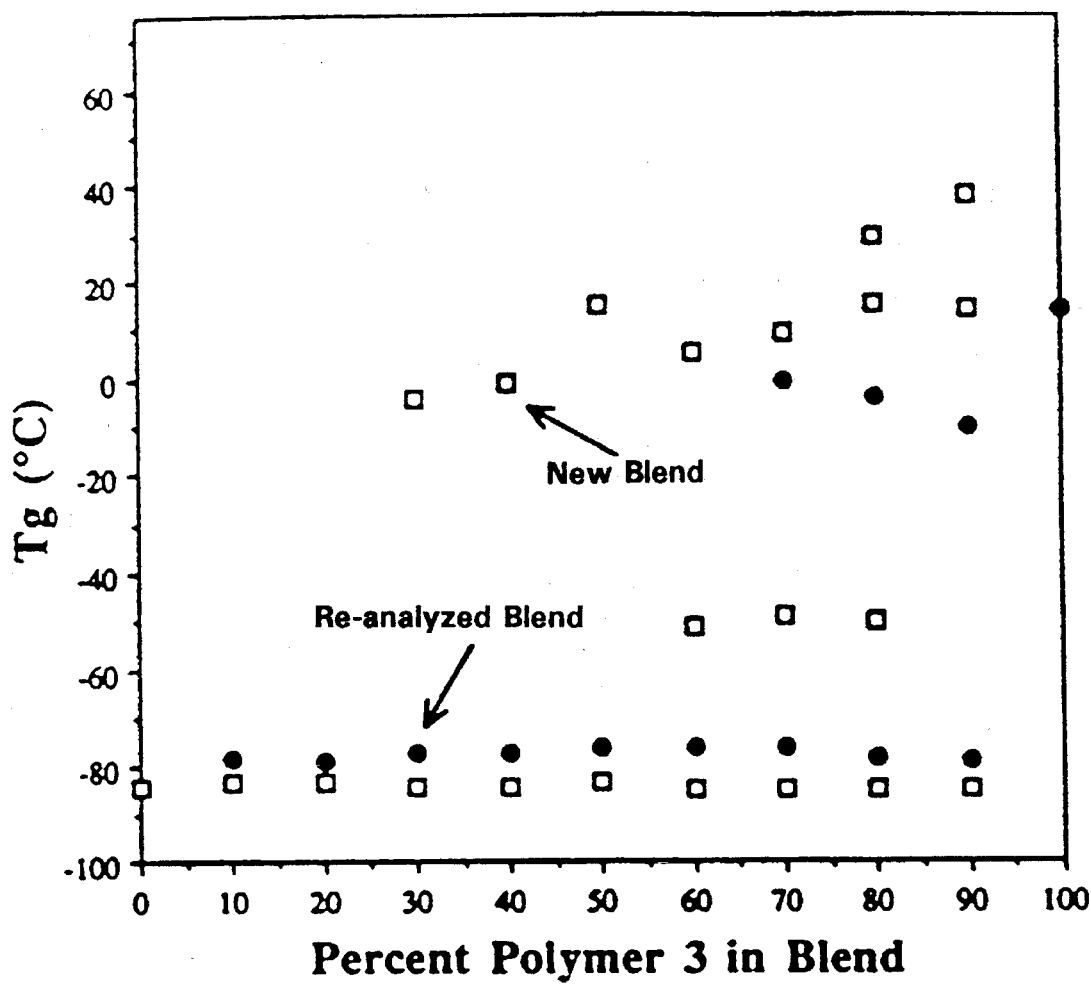
FIG. 3 is a graph of $T_g$ (degrees C) versus percent polymer 3 in old and new poly[bis(methylamino)phosphazene] (3)/poly[bis(2-(2-methoxyethoxy)ethoxy)phosphazene] (4) blends (circle, old blends; square, new blends).

Blends of 3 and 4 were reanalyzed by DSC after a period of 5 years. It was found that the transitions from the completely miscible regions no longer existed. This suggests that phase separation occurs slowly in this material. However, some semimiscibility appeared to be retained for samples with high loadings of polymer 3, as seen by a displacement of the $T_g$ values for polymer 3. This suggests that interactions, such as hydrogen bonding or dipole-dipole forces, provide some interactive stability for this material. FIG. 3 illustrates the $T_g$s at various ratios of the starting materials 3 and 4, for both the freshly prepared blends and the 5-year old samples. These hydrophilic blends could be fabricated into flexible films which were rendered insoluble, but swellable, in water when cross-linked by $^{60}$Co γ-radiation.

Figure 4:
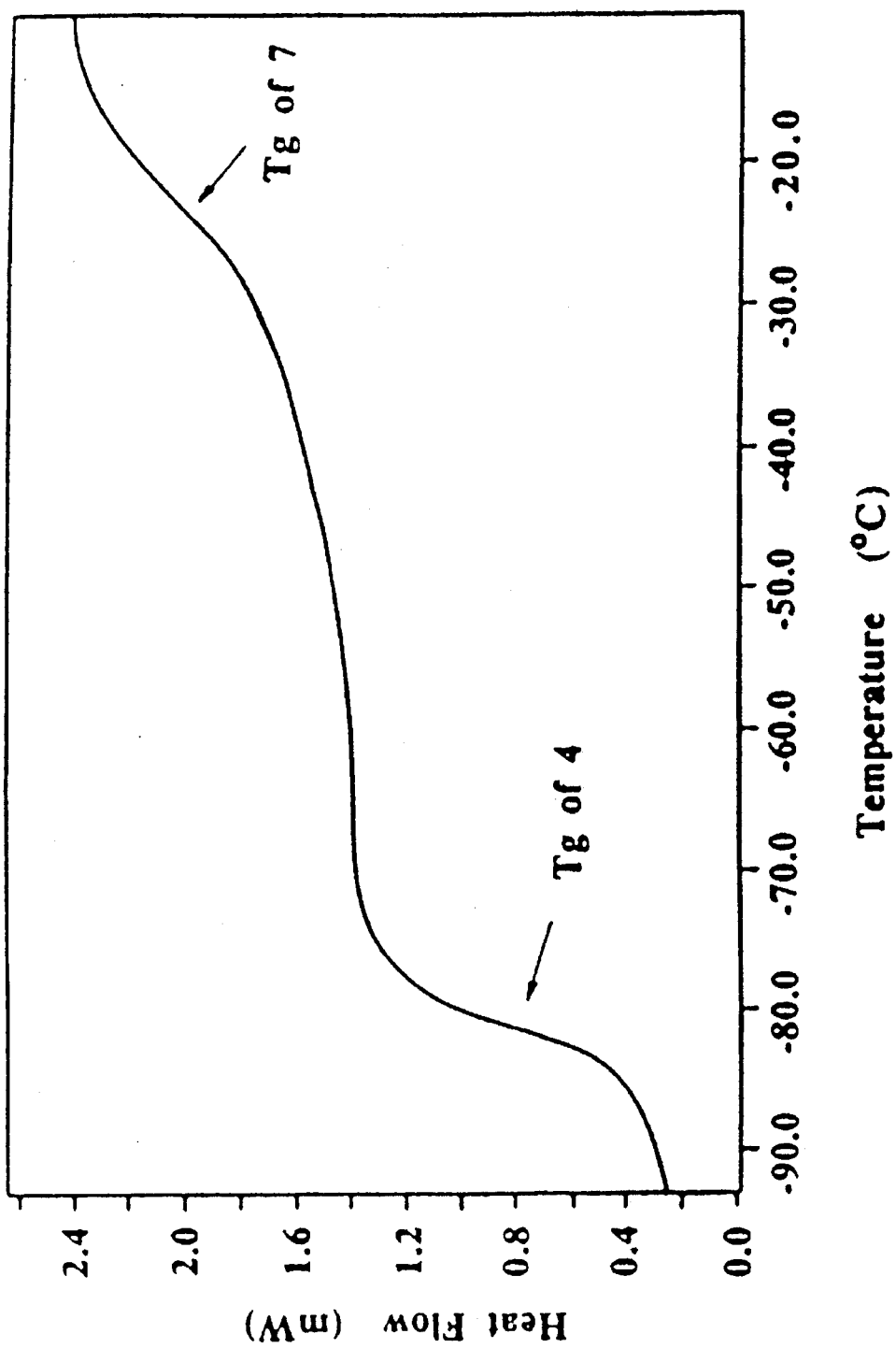
FIG. 4 is a DCS thermogram of a 60%/40% poly[bis(2-(2-methoxyethoxy)ethoxy)phosphazene] 4/poly[bis(propyloxy benzoate)phosphazene] 7 blend.

Other combinations of poly(organophosphazenes) from polymers 3–7 yield immiscible blends at all concentrations of the starting materials. FIG. 4 is a DSC thermogram of an immiscible system containing poly[bis(2-(2-methoxyethoxy)ethoxy)phosphazene] (4) and poly[di(propyloxybenzoate)phosphazene] (7). The material has two $T_g$'s, close to the values for the component materials. This lack of miscibility is reflected in the TEM micrograph for this material which shows definite domains of both component materials throughout the solid.

Figure 5:
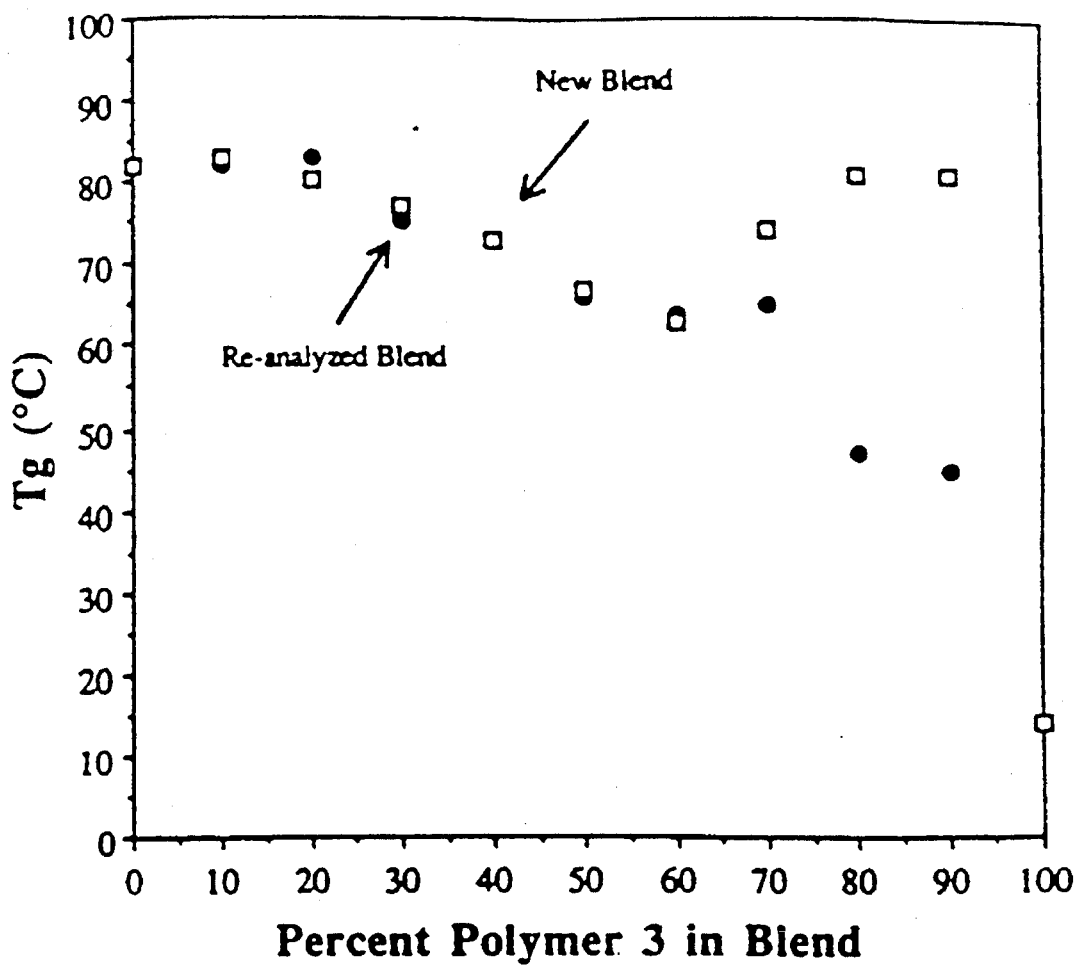
FIG. 5 is a graph of the $T_g$ (degrees C) versus percent polymer 3 in old and new poly[bis(methylamino)phosphazene] (3)/poly(vinyl chloride) (8) blends (circle, old blends; square, new blends).

Phosphazene/Organic Polymer Blends. Phosphazene/organic polymer blends were prepared from different ratios of starting materials ranging from 10% to 90% of each component polymer. The organic polymers included poly(vinyl chloride) (8), polystyrene (9), poly(methyl methacrylate) (10), poly(4-vinylpyridine) (11), poly(vinyl alcohol) (12), poly(acrylic acid) (13), and poly(ethylene oxide) (14). The molecular structures and $T_g$'s of these hydrophobic (8–11) and hydrophilic organic polymers (12–14) are illustrated in FIG. 2.

poly[bis(methylamino)phosphazene] (3) was partially miscible with several of the hydrophobic organic polymers including poly(vinyl chloride) (8), and polystyrene (9). For example, when polymer 3 was combined with poly(vinyl chloride) (8), single $T_g$'s were detected and were found to decrease in temperature from 10 to 60% loading of polymer 3. These glass transition temperatures were displaced from the $T_g$'s of the constituent polymers at +14 (3) and +82° C. (8). Semimiscible blends containing polymers 3 and 8 were reanalyzed by DSC after a period of 5 years. These blends showed a retention of miscibility in the region 10–60% loading of polymer 3. This indicates that the interactions between the components was relatively strong. FIG. 5 is a graph of $T_g$ as a function of the ratio of polymer 3 in the blend for both old and new materials containing polymers 3 and 8.

Figure 6:
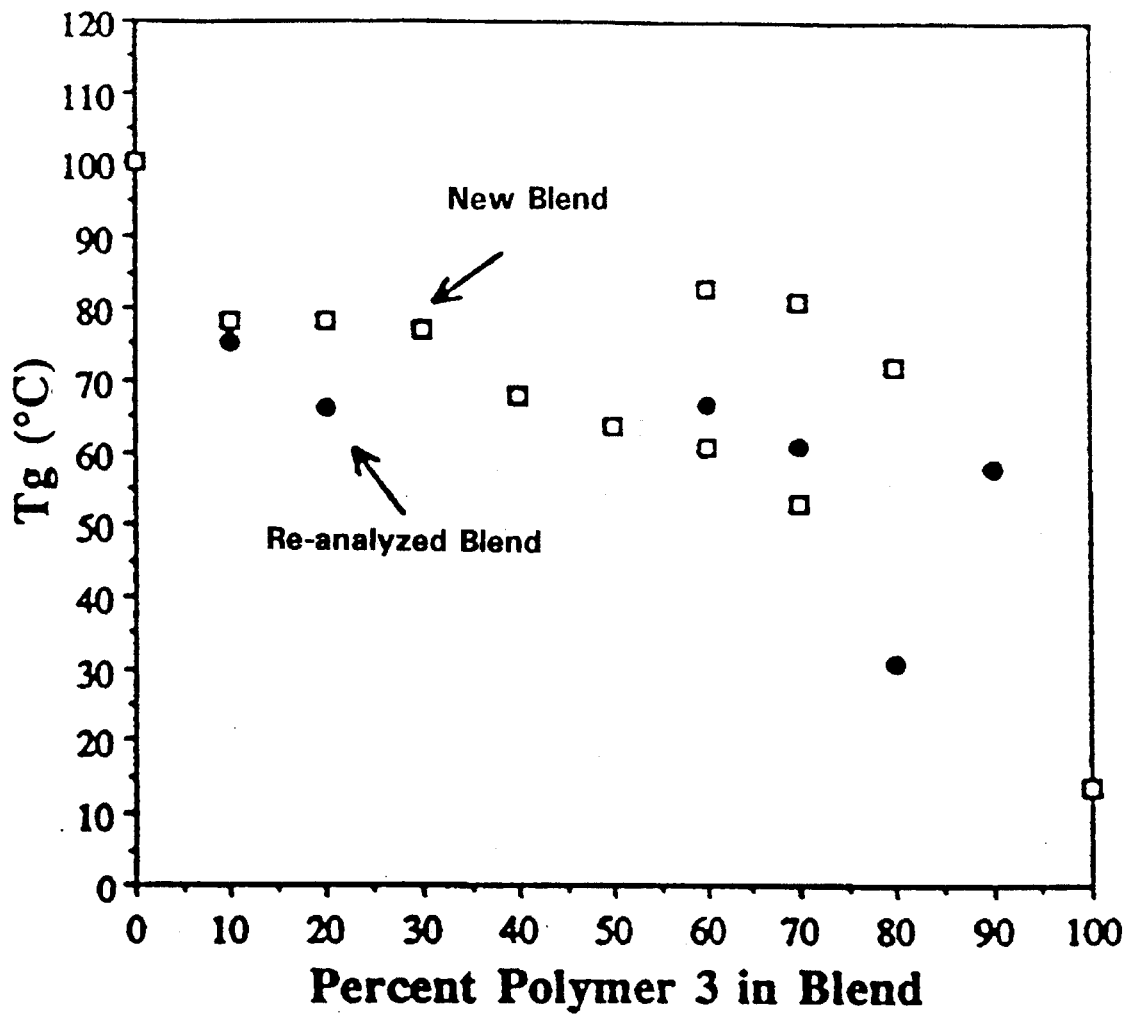
FIG. 6 is a graph of the $T_g$ (degrees C) versus percent polymer 3 in old and new poly[bis(methylamino)phosphazene] (3)/poly(styrene) (9) blends (circle, old blends; square, new blends).

Blends composed of poly(organophosphazene) 3 and polystyrene (9) were also found to be semimiscible alloys. Single $T_g$'s were detected in blends with 10–50% loading of polymer 3, and these transitions decreased in temperature (from 80° to 60° C.) as the loading of phosphazene polymer increased. Above 50% 3, two $T_g$'s were found in the DSC thermogram. This suggests that both miscible sections and phases rich in polystyrene exist within the materials. In poly[bis(methylamino)phosphazene]polystyrene blends, miscibility is probably encouraged through the weak proton accepting/electron donating nature of the aromatic groups of 9 and the proton donating/accepting character of the primary amino groups of polymer 3. The thermal transitions of blends containing polymers 3 and 9 were reanalyzed after a period of 5 years. Slight deviations were found between the two sets of DSC data, which may indicate a small amount of phase separation over time. These data are not surprising in view of the fact that aromatic hydrocarbons posses only weak donating/proton accepting capabilities. FIG. 6 is a graph of the $T_g$ as a function of the percentage of polymer 3 in the blends with polymer 9 for both old and new blends.

Figure 7:
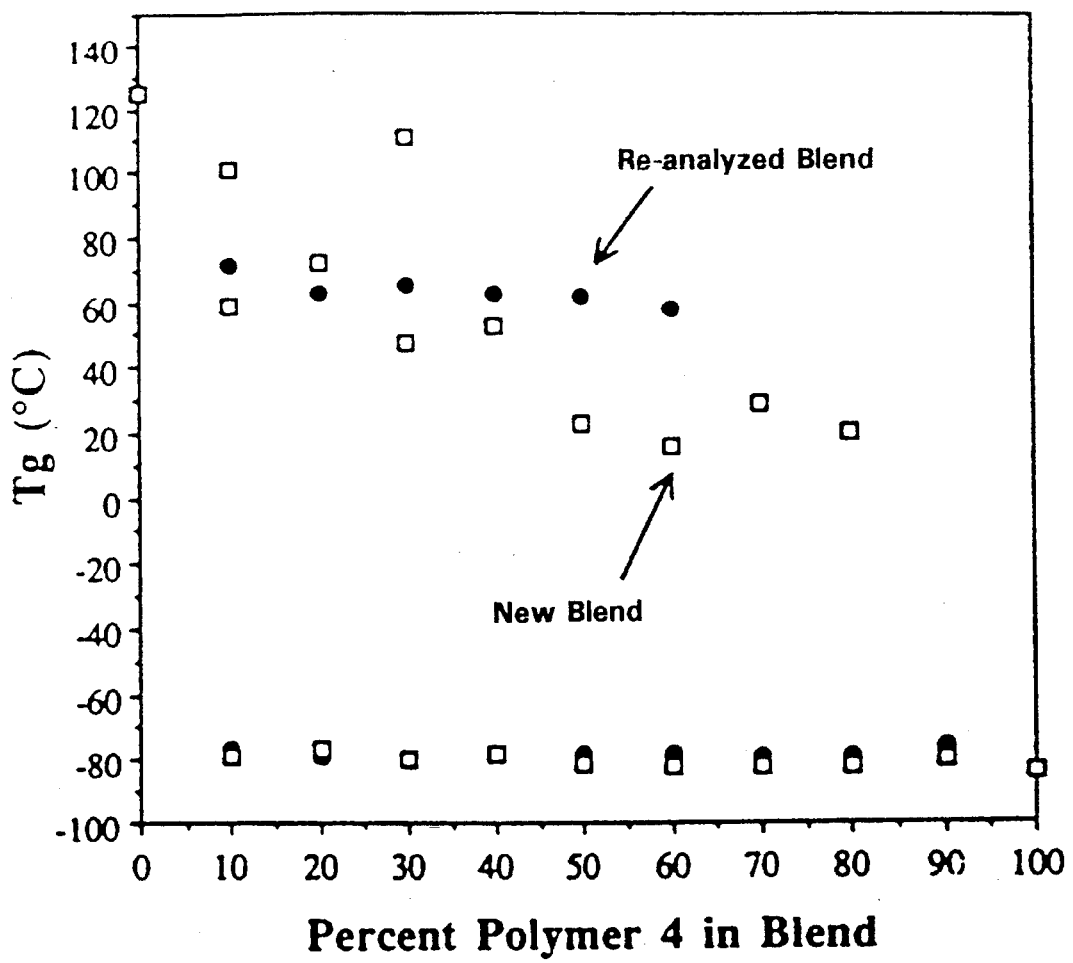
FIG. 7 is a graph of the T, (degrees C) versus percent polymer 4 in old and new poly[bis(2-(2-methoxyethoxy)ethoxy)phosphazene] (4)/poly(vinyl alcohol) (12) blends (circle, old blends; square, new blends).

Poly[bis(2-(2-methoxyethoxy)ethoxy)phosphazene] (4) was allowed to interact with poly(vinyl alcohol) (12) and was found to be semimiscible at all concentrations of the constituent polymers. In all the 4/12 samples, $T_g$'s from 4 were present at approximately −84° C. (which is the normal $T_g$ of 4) and in some cases, $T_g$'s close to the value of polymer 12 were detected, although these were displaced slightly from their normal value of +125° C. However, $T_g$'s were also detected in each sample at temperatures between those of the constituent polymers. These intermediate transitions were found in the range of +75 to +30: they moved to lower temperatures as the loading of polymer 4 increased. Blends containing polymers 4 and 12 were reanalyzed by DSC after 5 years and, although slight deviations occurred from the recent data, the materials were still semimiscible. Thus, the intermolecular interactions between the constituent polymers are quite strong. FIG. 7 provides the thermal transitions plotted as a function of the percent of polymer 4 in the blend with polymer 12 for both the old and new data.

Figure 8:
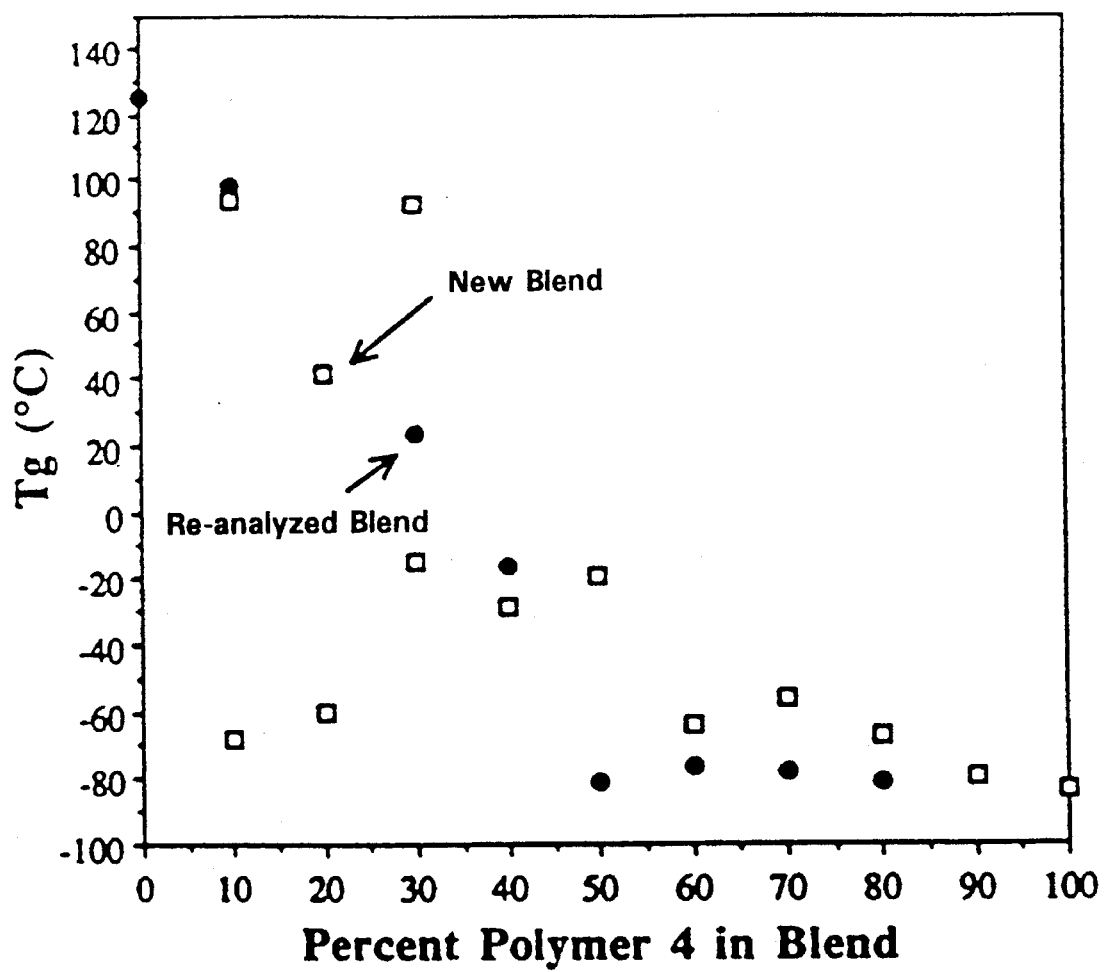
FIG. 8 is a graph of the T, (degrees C) versus percent polymer 4 in old and new poly[bis(2-(2-methoxyethoxy)ethoxy)phosphazene] (4)/poly(acrylic acid) (13) blends (circle, old blends; square, new blends).

Blends containing polymer 4 and poly(acrylic acid) (13) were prepared and were also found to be semimiscible. Most samples had $T_g$'s at −84° C. corresponding to polymer 4, and some showed transitions displaced slightly from +125° C. which corresponds to the $T_g$ of polymer 13. As in the previous systems, the new $T_g$'s were found in an intermediate temperature range compared to the pure materials. These intermediate $T_g$'s, in the range of +100° to −60° C. were found for blends containing between 10 and 60% polymer 4. The values moved to lower temperatures as the loading of polymer 4 increased. As in the other systems, the thermal transitions of the polymer 4/13 blends were reexamined by DSC after 5 years, and although a slight deviation exists between the corresponding values, the blends retained their miscibility over time. This persistent miscibility is due to the strong hydrogen bonding within the system. FIG. 8 provides the $T_g$s for the blend as a function of the percent incorporation of polymer 4 for both the old and new materials.

Figure 9:
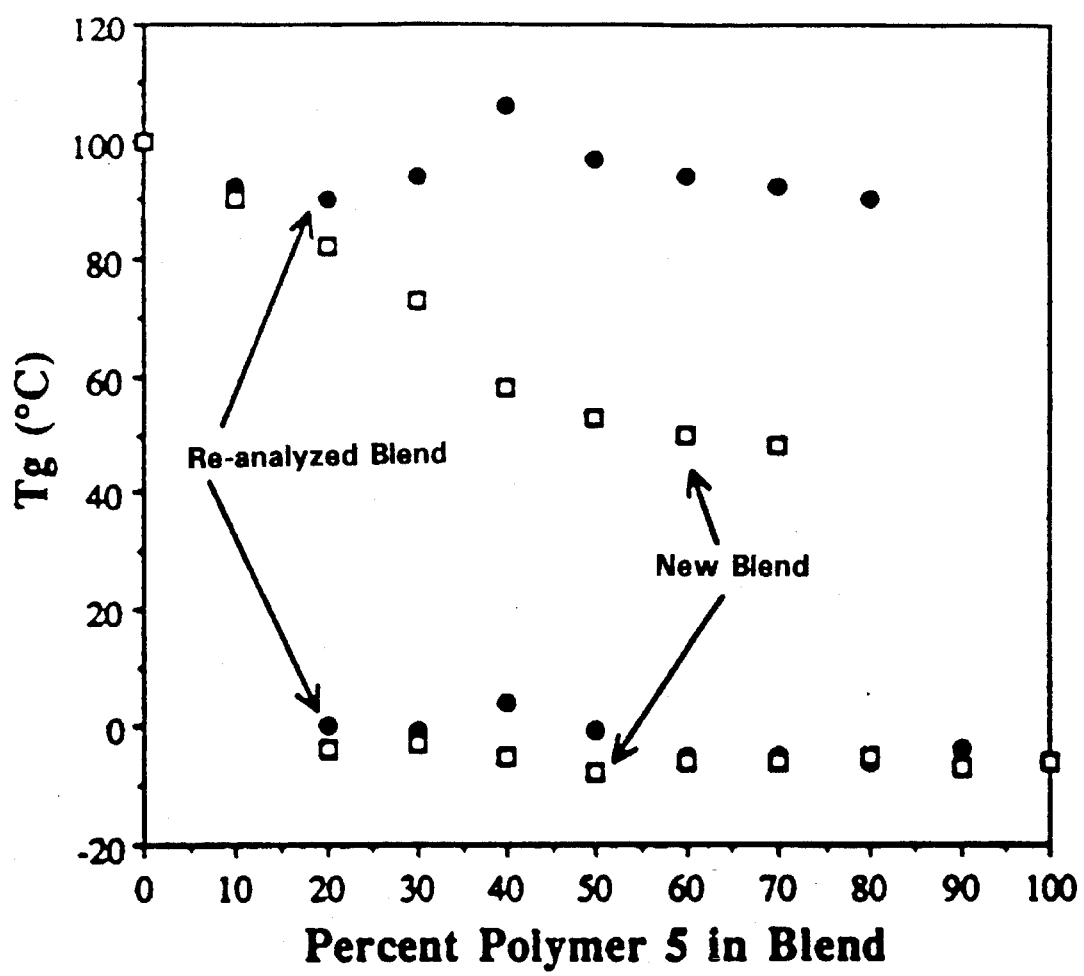
FIG. 9 is a graph of the $T_g$ (degrees C) versus percent polymer 5 in old and new poly[bis(phenoxy)phosphazene] (3)/poly(acrylic acid) (13) blends (circle, old blends; square, new blends).

Poly[bis(phenoxy)phosphazene] (5) was allowed to form an alloy with polystyrene (9) and was found to be semimiscible, and in particular, in concentrations between 10 and 70% loading of polymer 5. In every sample, a $T_g$ was detected at −6° C., which is the $T_g$ for polymer 5. Thus, domains exist in the blend which are composed solely of polymer 5. Additional transitions existed in an intermediate range (+90° to +50° C.) distinct from the constituent polymer $T_g$'s (−6 (5) and +100 (9)). These intermediate transitions fall at lower temperatures as the loading of polymer 5 increases in the system. This semimiscibility could be due, in part, to the similarity of the aromatic, hydrophobic side groups. FIG. 9 provides the differential scanning calorimetry data for different percentages of polymer 5 in polymer 9, for both old and new materials.

TEM micrographs were obtained for samples of both old and new blends containing polymers 5 and 9 in ratios of 50%/50% of each polymer. The TEM for the recently prepared alloy indicates a phase-separated material presumably containing regions composed solely of polymer 5 and regions containing the miscible portions of the blend.

Figure 10:
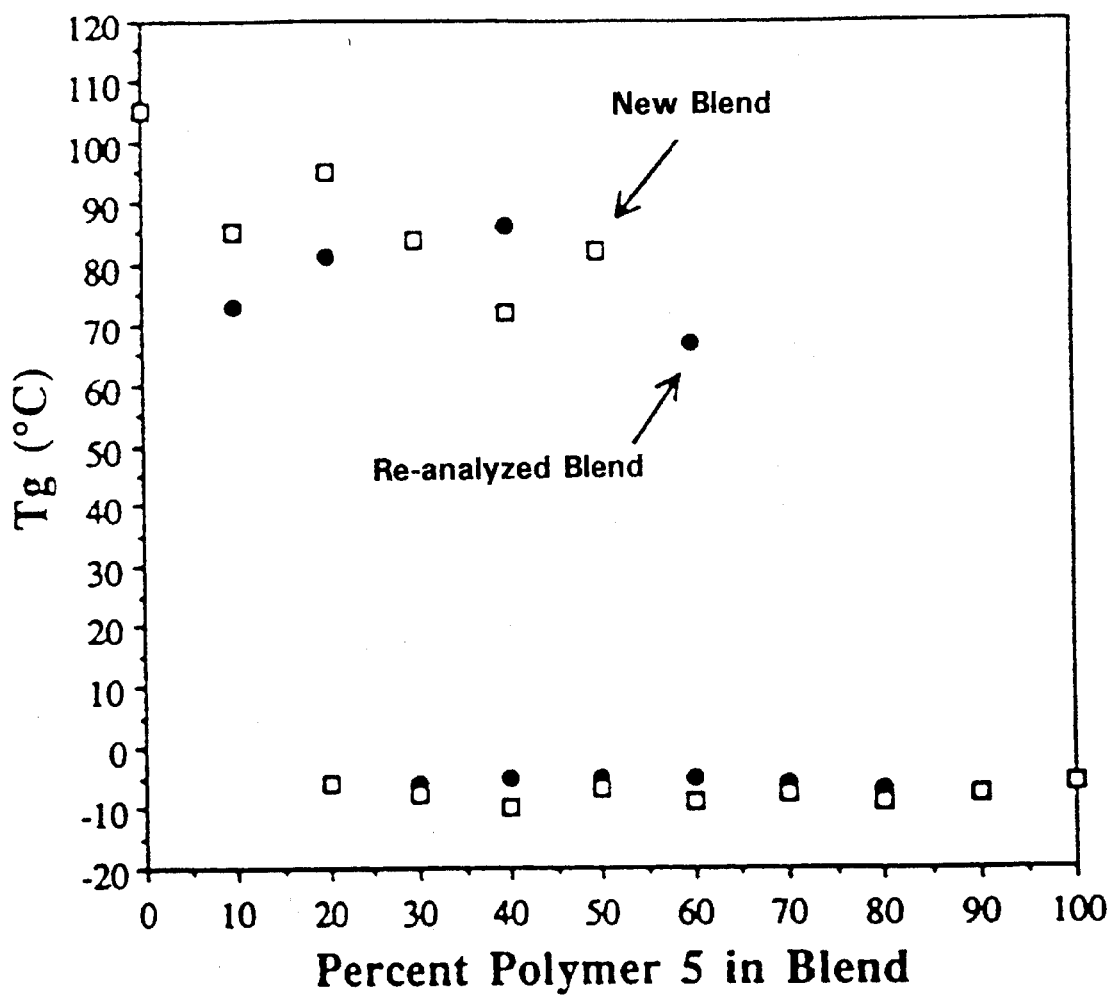
FIG. 10 is a graph of the $T_g$ (degrees C) versus percent polymer 5 in old and new poly[bis(phenoxy)phosphazene] (5)/poly(methyl methacrylate) (10) blends (circle, old blends; square, new blends).

Polymer blends of 5 with poly(methyl methacrylate) (10) were also semimiscible. Glass transition temperatures for the constituent polymers were −6 (5) and +106° C. (10) and transitions were found in each sample at −6° C. and also displaced from 105° C. Blends containing polymers 5 and 10 were reanalyzed by DSC after 5 years and, although some differences exist between the old and new materials, some miscibility remained in the system. FIG. 10 illustrates the $T_g$ of the polymer blends at various concentrations of polymer 5 for both the old and new blends.

IV. Crosslinking of Polymer Blends

The polymer blends disclosed herein can be crosslinked by homolysis of aliphatic C—H or C—Cl bonds to increase the structural integrity of the material. Crosslinking can be affected by exposure of the material to gamma, ultraviolet, or other high energy radiation (for example x-ray or electron beam) in an amount and for a time period sufficient to cause covalent bonding.

The optimal time period and dosage of radiation can be easily determined for the desired blend. When using gamma radiation, a dosage of between approximately 0.1 Mrad and 30 Mrad, and preferably, between 5 Mrad and 30 Mrad, for a period of time ranging from approximately one second to ninety days is sufficient Sources of gamma radiation include $^{60}$Co, nuclear reactor, and linear accelerator or synchrotron. Ultraviolet crosslinking is usually accomplished in a time period of one second to thirty minutes, depending on the UV source intensity.

Modifications and variations of the invention will be obvious to those skilled in the art from the foregoing detailed description of the invention. Such modifications and variations are intended to come within the scope of the appended claims.

We claim.

1. A polymer blend of poly[bis(methylamino)phosphazene] and poly[bis(2-(2-methoxyethoxy)ethoxy)phosphazene.

2. A polymer blend of poly[bis(methylamino)phosphazene] with a polymer selected from the group consisting of poly(vinyl chloride), poly(methyl methacrylate), poly(ethylene oxide), and poly(styrene).

3. A polymer blend of poly[bis(phenoxy)phosphazene] with poly(methyl methacrylate).

4. The polymer blend of claim 1 that is crosslinked.

5. The polymer blend of claim 2 that is crosslinked.

6. The polymer blend of claim 3 that is crosslinked.

* * * * *